UNITED STATES PATENT OFFICE.

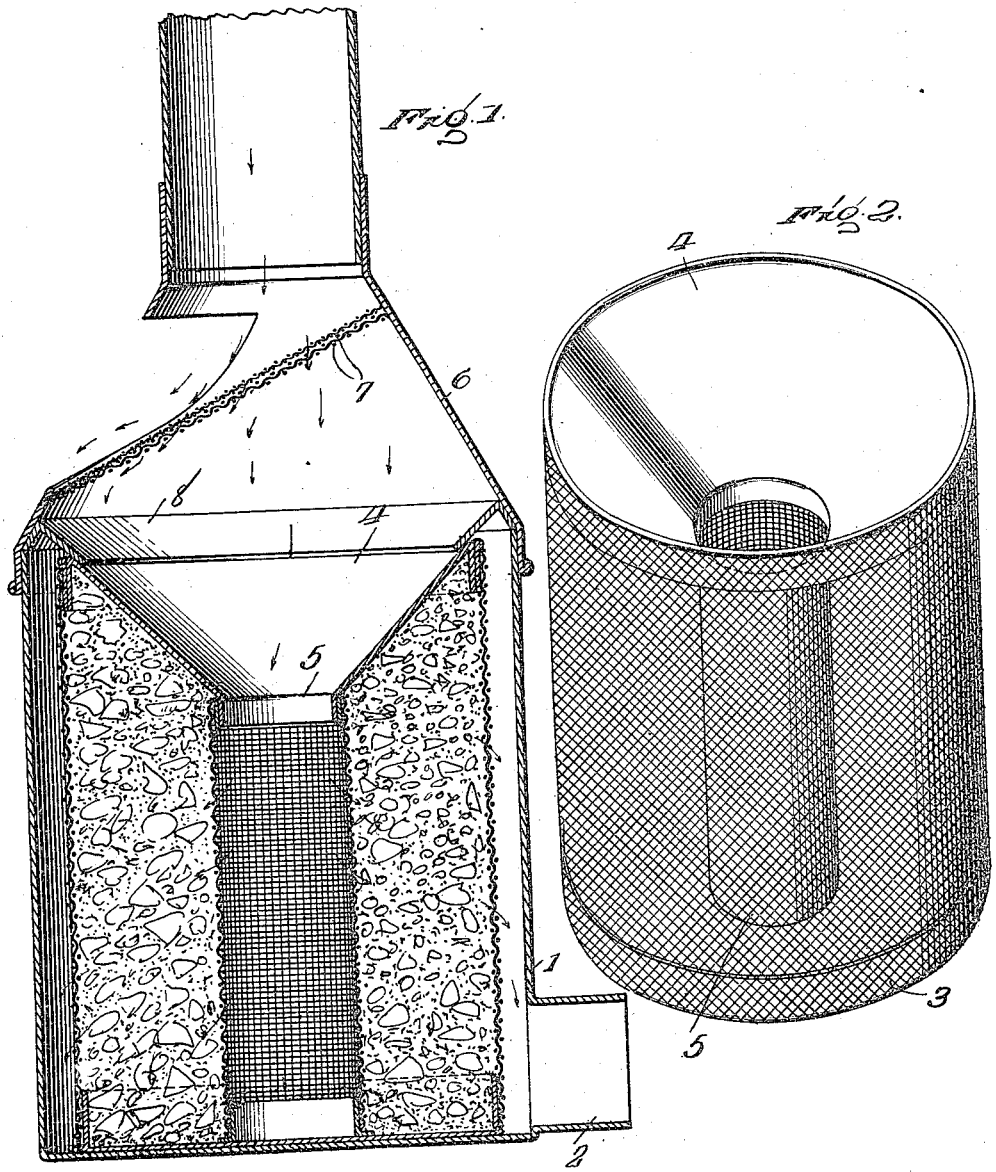

JUSTINE W. RANNEY, OF MAYNARD, IOWA, ASSIGNOR OF ONE-HALF TO ELIAL M. PAYNE AND ONE-HALF TO CHARLOTTE A. RANNEY, BOTH OF MAYNARD, IOWA.

RAIN-SPOUT FILTER.

1,260,277.     Specification of Letters Patent.     Patented Mar. 19, 1918.

Application filed November 28, 1917. Serial No. 204,328.

*To all whom it may concern:*

Be it known that I, JUSTINE W. RANNEY, a citizen of the United States, residing at Maynard, in county of Fayette and State of Iowa, have invented certain new and useful Improvements in Rain-Spout Filters, of which the following is a specification.

My invention relates to an improvement in automatic rain spout filters for cisterns and tanks. The object of my invention is to provide a filter of few parts easily constructed and assembled or taken apart which will effectually strain and filter the water from a down-spout on its way to a tank or cistern.

It consists mainly in three parts, namely: an outer container of galvanized iron or other sheet metal open at the top and having an outlet spout at or near the lower end, a screen of coarse mesh wire fitted to the outer container and removable therefrom and having an inner screen therein with a cone or funnel at the top leading to and discharging into this inner screen, the space between the inner and outer screen being filled with some filtering medium, such as gravel, charcoal or the like, and the third part, namely: a cone which constitutes an enlargement of the down-spout at its lower end and which is adapted to fit the top of the outer container and which has a reinforced screen extending diagonally thereacross to catch the leaves and other debris of a coarse nature flowing down through the down-spout lead-out at the side while the water continues on into and through the filter.

In the accompanying drawing, Figure 1 is a view showing cone-shaped top or cover and the container slightly separated but in position to be assembled; Fig. 2, is a view of the inner removable filter.

The numeral 1, is the outer container probably composed of galvanized iron or other suitable sheet metal substantially cylindrical in form, open at the top and having a spout 2, at the lower end for the discharge of the filtered water into the cistern or tank or other receptacle (not shown).

The numeral 3, is the removable charcoal or other filtering medium retainer. This is of a size to fit the outer container 1, and is made of some coarse mesh of wire in order to contain the filtering medium and prevent its escape while admitting of the free passage therethrough of the water being filtered. At the top a metal funnel 4, closes the upper end and leads to an inner screen 5, which is of relatively small diameter and like the outer screen, is reticulated to permit the water flowing down into the filter to escape throughout the entire filter mass into the outer container 1.

This filter retainer 3, is, of course, removable and capable of being washed and rinsed frequently without any difficulty by turning the hose on it or running water through it in any other manner.

A removable top or cover 6, is conical in form and adapted to fit the lower end of the down-spout slidably and to close the upper end of the outer container 1, as shown in Fig. 1.

A second section 7, made in two layers, that is to say, of fine and coarse mesh, extends diagonally across this top or cover to an opening in the side and through this the water flows and the coarse material, such as leaves, twigs and the like, are arrested by this screen and discharged through said opening of the conical top, thus preventing them from passing into the filter. The top or cover may be bolted or otherwise secured to the container 1, if desired.

The removable top or cover is provided with an inwardly extending circumferential flange 8, adapted to extend across the space between the outer container 1, and the filtering medium retainer 3, and extend into the upper end of the funnel 4, thereby holding the latter and the retainer centered and bridging over the space between the container and retainer so as to direct all water from the down-spout into the funnel.

In this way I have provided a simple device of few parts, capable of dismemberment or replacement or renovation at any time with the slightest amount of difficulty and inconvenience, while at the same time, it affords a certain means of filtering the rain water preparatory to use.

I claim:

A filter comprising an outer container, a reticulated filter medium retainer adapted to be removably placed therein, the retainer having a funnel at the top and a central inner screen leading therefrom to the bottom of the filtering medium retainer and a cover constructed and adapted to fit the upper end of the outer container and a down-spout and having a diagonally disposed strainer and provided with a flange which extends into the funnel in order to direct the water from the down-spout into the funnel.

In testimony whereof I affix my signature, in the presence of two witnesses.

JUSTINE W. RANNEY.

Witnesses:
WALTER BUENNEKE,
E. F. WARNKE.

Copies of this patent may be obtained for five cents each, by addressing the "Commissioner of Patents, Washington, D. C."